July 18, 1939.     L. E. ANDERSON ET AL     2,166,205
FIXED CAPACITOR
Filed May 29, 1937
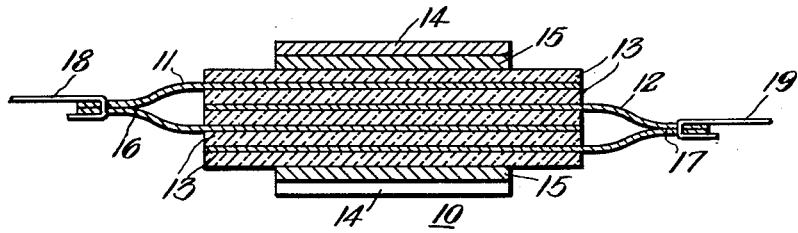
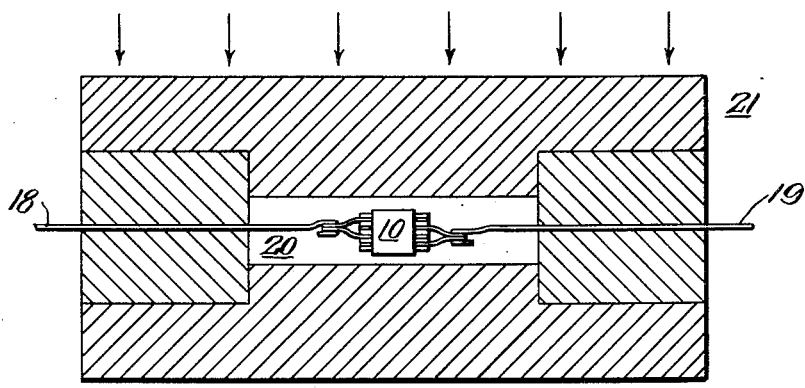
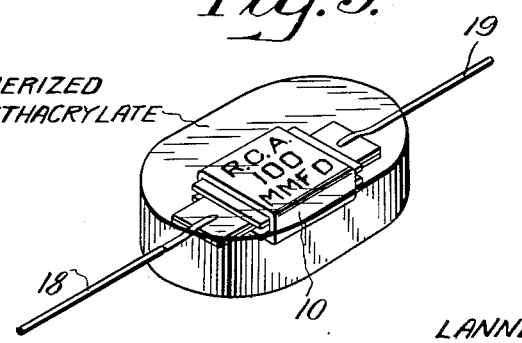
Inventors
LANNES E. ANDERSON
ARTHUR T. HARDING
Attorney Patented July 18, 1939

2,166,205

UNITED STATES PATENT OFFICE 2,166,205

FIXED CAPACITOR

Lannes E. Anderson, Collingswood, and Arthur T. Harding, Audubon, N. J., assignors to Radio Corporation of America, a corporation of Delaware Application May 29, 1937, Serial No. 145,454

5 Claims. (Cl. 175—41)

This invention relates to electric condensers, and particularly to "fixed" condensers for use in radio and other systems for the communication of intelligence.

While the invention will be described in connection with a condenser for use in radio receivers, having a value of capacitance suitable for such use, it is to be understood that the invention is not limited to the useful application here described, as the disclosure, in this respect, is merely illustrative for purposes of explaining the inventive concept.

The usual molded condenser comprising wax impregnated alternate layers of conductive and dielectric materials clamped together and encased in "Bakelite" or the like, has a positive temperature coefficient of capacitance. Such a capacitor, included in an L—C circuit subject to an increased ambient temperature, will decrease the resonant frequency to which the circuit is normally tuned.

Since inductors now commercially in use exhibit a positive temperature coefficient of inductance, such an inductor connected in an L—C circuit with a condenser of the type described, and subject to an increased ambient temperature, will further decrease the resonant frequency to which the circuit is normally tuned.

Accordingly, an object of this invention is to provide a fixed capacitor which shall exhibit a zero temperature coefficient of capacitance, or a temperature coefficient of capacitance of either sign and of a value which substantially compensates for the natural temperature coefficient of frequency of the circuit elements with which it is associated.

Another object of the invention is to provide a fixed capacitor possessing very stable electrical and physical characteristics when exposed to abnormal conditions of temperature and humidity.

Another object of the invention is to provide a simple, accurate and efficient method of manufacturing fixed condensers, and one which substantially eliminates any uncertainties with regard to the temperature coefficient of capacitance and other operating characteristics of the finished condenser.

Other objects and advantages will be apparent and the invention itself will be best understood by reference to the following specification and to the accompanying drawing, wherein:

Figure 1 is a sectional view through a condenser stack of a type to which the invention particularly relates, Figure 2 is a sectional view of a mold which may be employed in carrying the casing material of the present invention to the condenser stack of Fig. 1, and Figure 3 is a perspective view of a fixed capacitor constructed in accordance with the principle of the invention.

The present invention contemplates and its practice provides a molded condenser wherein the casing material comprises a thermo-plastic (instead of a "thermo-setting") compound which exhibits a higher temperature coefficient of expansion than any of the parts constituting the condenser stack. By proper selection of the materials constituting the stack elements, including the stack clamping member, and by correlating the thickness and molding pressure applied to the casing material, a finished condenser possessing any desired temperature coefficient of capacitance, of either sign and within a certain range, may be obtained.

In the accompanying drawing, 10 designates generally a condenser stack formed, for example, of alternate layers of metal foil 11, 12 and mica 13, or impregnated paper, held in rigid alignment by a metal clamping member 14 which exerts its clamping force about a clamping plate or band 15. The side edges of the metal layers are exposed and all of the exposed edges on a given side are shown joined together as indicated at 16 and 17, as by stapling or welding. These multi-ply exposed conductive layers 11 and 12 terminate respectively in outwardly extending oppositely located leads 18 and 19.

In carrying the invention into effect, the general rule for a given molding pressure and casing thickness is: the higher the temperature coefficient of expansion exhibited by the condenser stack, per se, the more negative (or less positive) is the temperature coefficient of capacitance of the finished condenser. While it is entirely possible to control the thermal characteristics of the condenser stack by a proper selection of the materials constituting the dielectric and armature plates, in the interest of economy it is preferable to utilize either or both of the clamping members 14 and 15 as the elements controlling the degree of thermal expansion of the stack. Thus, using the same condenser armatures or "plates" and the same dielectric material (say, mica) in all cases, a stack clamped with nickel-steel alloy clamping members will exhibit a lower temperature coefficient of expansion than one clamped with steel, and one clamped with steel will exhibit a lower temperature coefficient of expansion than one clamped with brass. Other variations may be obtained by employing different metals of various thicknesses for the materials forming the individual clamping members 14 and 15.

In accordance with the invention, and irrespective of the exact temperature coefficient of expansion exhibited by the condenser stack and its clamping members, the casing material should be one the temperature coefficient of expansion of which is higher than that of the stack and its clamping members. By way of example, the temperature coefficient of expansion of the casing material may be substantially of the order of 7 to $9\times10^{-5}$ or substantially ten times that of soft iron.

The casing material, in addition to exhibiting the above described essential characteristics, should likewise exhibit very stable electrical characteristics and be resistant to moisture. Among the thermo-plastic compounds possessing the above attributes are the methacrylate resins, and particularly polymerized methyl methacrylate. This last mentioned compound (known commercially as "Lucite") possesses the added advantage of being transparent. This permits the usual symbols indicative of origin and rating to be marked on the stack, or other place, within the casing, where they are not subject to erasure, as by handling. It further permits of visual inspection for mechanical imperfections in the stack.

The elements constituting the condenser stack and including clamping members 14 and 15 are preferably first subjected to a force of, say, 120,000 pounds per square inch of clamping surface and are then placed in the cavity 20 of a suitable mold 21 which, preferably, has been preheated. The casing material, which may be "Lucite", in granular or powdered form, is then poured into the mold, which is then closed and subjected to a molding force of substantially 2,000 pounds per square inch at a temperature of substantially 150° C. for several minutes. The mold is then opened and the capacitor removed and permitted to cool.

Capacitors employing two clamping plates 15 each of steel substantially .015" thick and an "Invar" clamping member 14, substantially .02" thick, and ½" wide clamping a stack substantially ⅛" thick, embedded in a "Lucite" casing ¼" thick, was found to exhibit a substantially zero temperature coefficient of capacitance throughout a range of substantially 25° to 55° C. Capacitors similarly formed but utilizing all steel clamping elements of somewhat greater thickness exhibit a slightly negative temperature coefficient of capacitance. Those employing brass clamps, similarly constructed, exhibit a slightly higher negative coefficient of capacitance than those clamped with steel bands.

A slightly positive temperature coefficient of capacitance may be achieved with a condenser stack clamped, in the manner above described, with a single "Invar" clamping (14) member and embedded in a somewhat thinner "Lucite" casing.

Without limiting the invention to any theory of operation, the described characteristics of the several embodiments of the invention may be accounted for as follows:

In prior art condensers wherein but little clamping force is exerted upon the stack there may be said to be but one factor operating to alter the temperature-capacitance characteristic, i. e. the increase in area of the armature plates when subject to increased temperature. This causes an increase in capacitance. Since the clamping force is usually negligible the spacing between the plates at elevated temperatures does not change appreciably and may be disregarded. On the other hand, when, in accordance with the present invention, the stack is subjected to a relatively enormous clamping force, which is relieved or decreased by the expansion of the clamp when it is subject to increased temperatures, an appreciable separation of the plates occurs. This increase in the spacing of the plates decreases the capacitance of the condenser and this compensates for the increase in capacitance due to the increase in the area of the plates.

It is thus entirely practical, in accordance with the invention, to achieve a finished condenser which will exhibit a substantially zero temperature coefficient of capacitance by selecting the original clamping force with due regard to the temperature coefficient of expansion of the material comprising the clamp. The use of "Invar" increases the clamping force when the clamp is subject to increased temperature, while the use of steel or brass decreases it.

It is also practical, in accordance with the teachings of the invention, to so correlate these forces as to achieve a capacitor having a temperature coefficient of capacitance of either sign and of a desired low value.

Fig. 3 shows a condenser stack 10 of Fig. 1, marked on its clamping band with indicia indicative of its origin and rating, and embedded in a casing of polymerized methyl methacrylate ("Lucite"), all in accordance with the invention. Obviously, the markings on the stack and the contour of the condenser casing are immaterial.

As the invention is susceptible of various modifications, it is to be understood that the foregoing is to be interpreted as illustrative and not in a limiting sense except as required by the prior art and the spirit of the appended claims.

What is claimed is:

1. A condenser comprising a condenser stack and a clamp about said stack, the clamping force exerted upon said stack by said clamp being normally so great that upon changes in the dimensions of said clamp, due to changes in the ambient temperature, the spacing between the stack elements is altered to a degree sufficient to produce a change in capacitance of a value comparable to the change in capacitance with temperature caused by the change in area of the said stack elements.

2. The invention as set forth in claim 1 wherein said condenser stack and the clamp therefor is embedded in a thermo-plastic insulating compound, the temperature coefficient of expansion of which is substantially greater than that of said stack and clamp.

3. The invention as set forth in claim 1 wherein said clamp is constituted substantially entirely of "Invar".

4. A condenser comprising a condenser stack, and a clamp about said stack, the clamping forces exerted upon said stack by said clamp being normally of such high intensity that upon expansion of said clamp, due to an increase in the ambient temperature, the spacing between the elements constituting said stack is increased to a degree sufficient to produce a decrease in capacitance which compensates for the increase in capacitance, with temperature, caused by the expansion in area of stack elements.

5. Method of manufacturing a condenser which comprises subjecting a condenser stack to clamping force of upwards of 100,000 pounds per square inch, embedding said clamped condenser stack in a thermo-plastic material, and applying heat and pressure of an intensity and duration sufficient to cure said thermo-plastic material.

LANNES E. ANDERSON.
ARTHUR T. HARDING.